United States Patent
Kim et al.

(10) Patent No.: US 9,768,821 B2
(45) Date of Patent: Sep. 19, 2017

(54) PROTECTING MOBILE TERMINAL USING EXTERNAL COVER

(71) Applicant: LG ELECTRONICS INC., Seoul (KR)

(72) Inventors: Jaemoon Kim, Seoul (KR); Insu Song, Seoul (KR); Jaewook Lee, Seoul (KR); Inseok Yoo, Seoul (KR); Youngmin Lee, Seoul (KR); Hyunin Yoo, Seoul (KR); Aram Shin, Seoul (KR); Guetae Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/205,883

(22) Filed: Jul. 8, 2016

(65) Prior Publication Data
US 2017/0012659 A1    Jan. 12, 2017

(30) Foreign Application Priority Data

Jul. 10, 2015  (KR) .................. 10-2015-0098446
Jul. 10, 2015  (KR) .................. 10-2015-0098479

(51) Int. Cl.
*H04W 4/00*        (2009.01)
*H04B 1/3888*     (2015.01)
(Continued)

(52) U.S. Cl.
CPC ......... *H04B 1/3888* (2013.01); *G06F 1/1626* (2013.01); *G06F 1/1656* (2013.01);
(Continued)

(58) Field of Classification Search
CPC .................. H04B 1/3888; H04B 1/385; H04B 2001/3894; H04B 1/3877; H04B 1/3883; H04B 2001/3861; H04B 1/3827; H04B 2001/3866; H04B 1/3838; A45C 2011/002; A45C 11/00; A45C 2011/003; A45C 2200/15; A45C 2013/025; A45C 13/02;
(Continued)

(56) References Cited

U.S. PATENT DOCUMENTS

2012/0039023 A1    2/2012  Renwick
2013/0165190 A1    6/2013  Ko et al.
(Continued)

FOREIGN PATENT DOCUMENTS

EP    3024203 A1    5/2016

*Primary Examiner* — Golam Sorowar
(74) *Attorney, Agent, or Firm* — Birch, Stewart, Kolasch & Birch, LLP

(57) ABSTRACT

Provided is a mobile terminal. The mobile terminal includes a window, a display disposed on a rear surface of the window to output an image, a terminal body having a front surface on which the window is disposed, and an external cover coupled to an outer surface of the terminal body to protect an outer appearance of the terminal body. The external cover comprises a front cover that covers at least one outer surface of top, bottom, left, and right surfaces of the terminal body and a portion of a front surface of the window. Since the external cover covers a portion of a front surface of the mobile terminal in addition to an outer surface of the mobile terminal, an area for protecting the mobile terminal against an external impact or foreign substances may increase.

12 Claims, 19 Drawing Sheets

(51) Int. Cl.
*G06F 1/16* (2006.01)
*H04M 1/18* (2006.01)
*H04M 1/02* (2006.01)
*H04W 88/02* (2009.01)

(52) U.S. Cl.
CPC ....... *H04M 1/0266* (2013.01); *H04M 1/0283* (2013.01); *H04M 1/185* (2013.01); *G06F 2200/1633* (2013.01); *H04M 1/0249* (2013.01); *H04M 1/0254* (2013.01); *H04M 1/0262* (2013.01); *H04M 1/0264* (2013.01); *H04W 88/02* (2013.01)

(58) Field of Classification Search
CPC ..... A45C 13/36; A45C 15/00; A45C 2200/10; A45C 11/04; A45C 13/002; A45C 13/10; G06F 1/1626; G06F 2200/1633; G06F 1/1656; G06F 1/1628; G06F 1/1632; G06F 1/1637; G06F 2200/1634; G06F 1/1643; G06F 3/041; G06F 3/0412; G06F 3/0416; G06F 3/04886; G06F 1/1616
See application file for complete search history.

(56) References Cited

U.S. PATENT DOCUMENTS

| | | |
|---|---|---|
| 2013/0303241 A1 | 11/2013 | Coker et al. |
| 2014/0045557 A1 | 2/2014 | Chung |
| 2015/0059251 A1 | 3/2015 | Rinner et al. |
| 2015/0068935 A1* | 3/2015 | Kay ..................... A45C 13/36 206/320 |
| 2015/0194648 A1* | 7/2015 | Fathollahi ........... H01M 2/1061 429/98 |
| 2015/0257285 A1* | 9/2015 | Wilson .................... H04M 1/18 224/235 |

* cited by examiner

PROTECTING MOBILE TERMINAL USING EXTERNAL COVER

CROSS-REFERENCE TO RELATED APPLICATIONS

The present application claims priority under 35 U.S.C. 119 to Korean Patent Application No. 10-2015-0098446, filed on Jul. 10, 2015, and to Korean Patent Application No. 10-2015-0098479, filed on Jul. 10, 2015, which are hereby incorporated by reference in their entireties.

BACKGROUND

The present disclosure relates to a mobile terminal.

Terminals may be classified into mobile/portable terminals and stationary terminals according to whether the terminals are portable. Also, the mobile/portable terminals may be classified into handheld terminals and vehicle mounted terminals according to whether the terminals are directly portable by a user.

Such a mobile terminal is diversified in function. For example, the mobile terminal may have data and voice communication, photograph shooting using a camera, video shooting, voce recording, music file playing using a speaker system, and outputting of an image or video on a display. An electronic game play function and multimedia player function may be added to some terminals. Particularly, the mobile terminal may receive a multicast signal that provides visual contents such as broadcasting and video or television program.

As described above, as the terminal is diversified in function, the terminal is being realized as the form of multimedia player having multiple functions such as, for example, photograph or video shooting, music or moving picture file playing, game, receiving of broadcasting, and the like.

Also, to support the terminal and increase functions, improvement in structural portions and/or software portions of the terminal may be considered.

A protection case may be separately provided outside the mobile terminal to protect an outer appearance of the terminal from being contaminated by an impact applied from the outside or foreign substances. The protection case may be formed in a shape corresponding to an outer appearance of the mobile terminal and thus be selectively covered along an outer surface of an edge of the mobile terminal.

However, in the case according to the related art, since the protection case is separately manufactured and then is covered on an outer surface of the mobile terminal, the mobile terminal may increase in total thickness. Also, since a user pursuing aesthetics avoids the deterioration in design of the mobile terminal due to the mounting of the protection case, the protection case may not give satisfactory results in the protection of the mobile terminal.

SUMMARY

Embodiments provide a mobile terminal that is capable protecting an outer appearance thereof and improving aesthetics.

In one embodiment, a mobile terminal includes: a terminal body having a front surface; a window disposed at the front surface of the terminal body, the window having a front surface and a rear surface; a display disposed at the rear surface of the window to output an image; and an external cover coupled to an outer surface of the terminal body to protect an outer appearance of the terminal body, the external cover including a front cover that covers at least one outer surface of a top surface of the terminal body, a bottom surface of the terminal body, a left of the terminal body, or a right surface of the terminal body and a portion of the front surface of the window.

The front cover may include: a first cover that covers the top surface of the terminal body and an upper front surface of the window; and a second cover that covers the bottom surface of the terminal body and a lower front surface of the window.

The first cover may include a main body covering the upper front surface of the window; and a curved part curved backward from an end of the main body to cover the top surface of the terminal body. The second cover may include: a main body covering the lower front surface of the window; and a curved part curved backward from an end of the main body to cover the bottom surface of the terminal body.

The window may include an upper coupling groove that is recessed backward by a predetermined distance to form an upper stepped portion to which the main body of the first cover is coupled, the main body of the first cover being seated in the upper coupling groove; and a lower coupling groove that is recessed backward by a predetermined distance to form a lower stepped portion to which the main body of the second cover is coupled, the main body of the second cover being seated in the lower coupling groove.

The mobile terminal may further comprise an upper coupling sheet located between a seating surface of the upper coupling groove and a rear surface of the main body of the first cover; and a lower coupling sheet located between a seating surface of the lower coupling groove and a rear surface of the main body of the second cover.

Each of the upper coupling sheet and lower coupling sheet has a relatively higher rigidity than that of the main body of the corresponding first and second covers.

At least one of the upper coupling sheet or lower coupling sheet has a through hole passing therethrough.

The sum of a thickness of the upper coupling sheet and a thickness of the main body of the first cover corresponds to a recessed depth of the upper coupling groove.

The mobile terminal may further comprises an adhesion part for coupling an end of the main body of the first cover to the window is disposed on an area on which the upper stepped portion of the window is formed.

The adhesion part may comprise epoxy that is applied to the area on which the upper stepped portion of the window is formed.

The external cover may further comprise a rear cover coupled to a rear surface of the terminal body to cover the rear surface of the terminal body.

The external cover may be formed of a material that is selected from the group consisting of natural leather, synthetic leather, and fabric.

A user manipulation unit for inputting a manipulation command of a user by touch may be disposed on a lower front surface of the window that is covered by the external cover, and wherein the external cover may input the manipulation command through the user manipulation unit when the user touches a top surface of the external cover.

In another embodiment, a mobile terminal includes: a terminal body having a front surface and a rear surface; a window disposed at the front surface of the terminal body, the window having a front surface and a rear surface; a display disposed at the rear surface of the window to output an image; a first cover covering at least a portion of a top surface of the terminal body and an upper front surface of the window; a second cover covering at least a portion of a bottom surface of the terminal body and a lower front surface of the window; and a rear cover coupled to the rear surface of the terminal body to cover the rear surface of the terminal body.

A first coupling groove that is recessed backward by a predetermined distance to form a stepped portion with respect to another area of the window may be defined in an area of a front surface of the window to which the first cover is coupled, wherein a second coupling groove that is recessed backward by a predetermined distance to form a stepped portion with respect to said another area may be defined in an area of the front surface of the window to which the second cover is coupled, wherein at least a portion of the first cover may be seated in the first coupling groove, and wherein at least a portion of the second cover may be seated in the second coupling groove.

A coupling sheet that provides adhesion force on both surfaces thereof may be disposed between the first coupling groove and the first cover and between the second coupling groove and the second cover.

In further another embodiment, a mobile terminal may include: a terminal body having a front surface; a window disposed at the front surface of the terminal body, the window having a front surface and a rear surface; a display disposed at the rear surface of the window to output an image; an external cover disposed on an exterior of the terminal body; and an appearance sheet disposed between the external cover and the terminal body to define an outer appearance of the external cover, the appearance sheet being formed of a material having relatively higher rigidity than that of the external cover.

The external cover may be formed of at least one of natural leather, synthetic leather, wood film, or fabric, and wherein the appearance sheet may be formed of at least one of carbon fiber-reinforced plastic (CFRP), glass fiber-reinforced plastic, or metal.

The external cover may include: a main body disposed at a rear side of a rear surface of the terminal body; and an extension part extending from the main body to a front side of the terminal body, the extension part being disposed at an edge of the window on the front surface of the terminal body to cover a portion of the front surface of the terminal body.

The external cover may include a bent part that is bent from an end of the extension part to extend towards the rear side of the terminal body, the bent part extending from the front surface of the window to the rear surface of the window.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments disclosed in this specification is described with reference to the accompanying drawings, and the same or corresponding components are given with the same drawing number regardless of reference number, and their duplicated description will be omitted. Furthermore, terms, such as a "module" ad a "unit", are used for convenience of description, and they do not have different meanings or functions in themselves. Moreover, detailed descriptions related to well-known functions or configurations will be ruled out in order not to unnecessarily obscure subject matters of the present disclosure. However, this does not limit the present disclosure within specific embodiments and it should be understood that the present disclosure covers all the modifications, equivalents, and replacements within the idea and technical scope of the present disclosure.

A mobile terminal described in this specification may include mobile phones, smart phone, notebook computers, terminals for digital broadcasting, personal digital assistants (PDAs), portable multimedia players (PMPs), navigators, slate PCs, tablet PCs, ultrabooks, wearable devices (for example, smartwatchs, smart glasses, and head mounted displays (HMDs), and the like.

However, those skilled in the art will easily understand that the constituents disclosed in this specification is capable of being applied to fixed terminals such as digital TVs, desktop computers, and digital signages except for a case in which the constituents are capable of being applied to only the mobile terminals.

Figure 1:
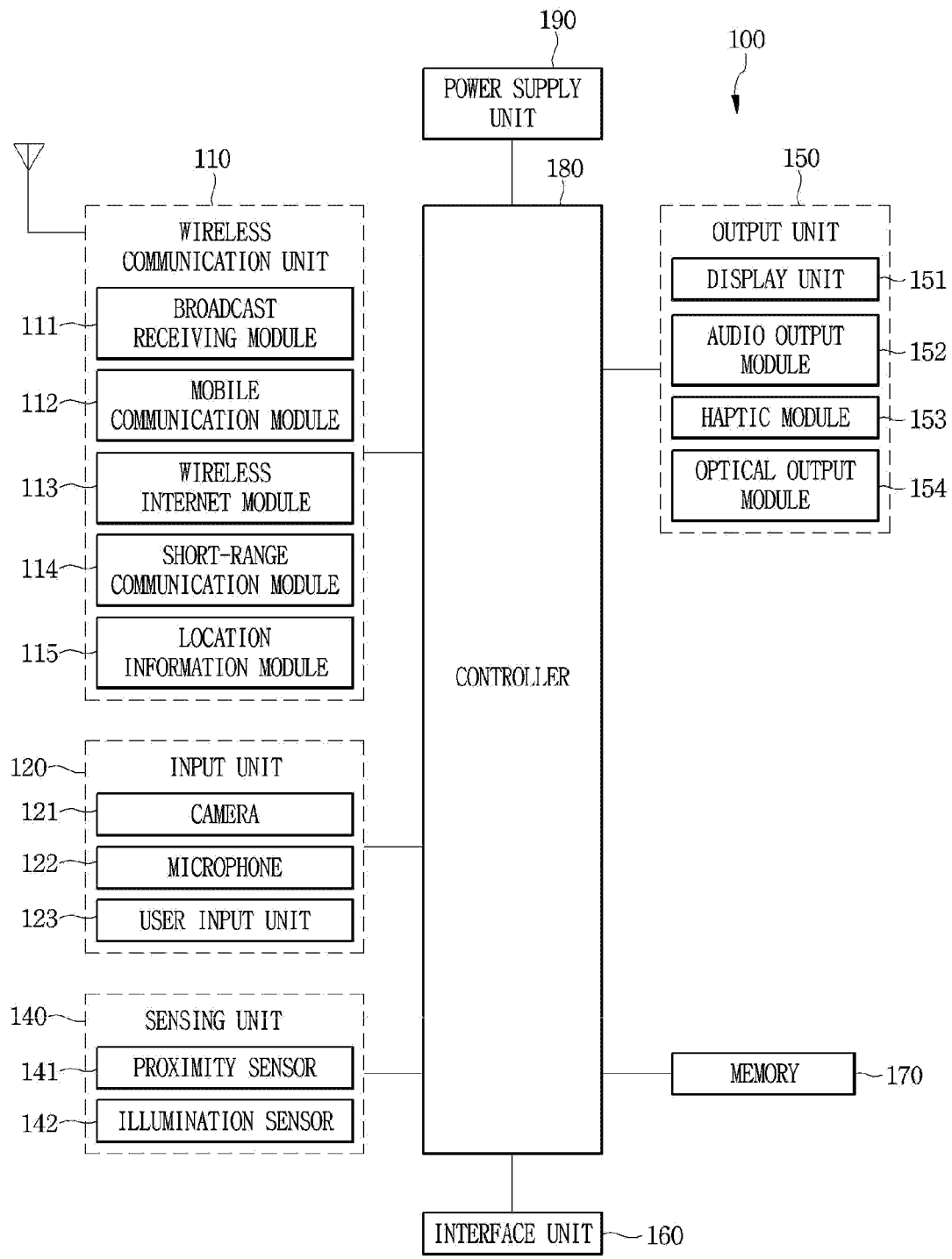
FIG. 1 is a block diagram for explaining a mobile terminal according to an embodiment.
Figure 2:
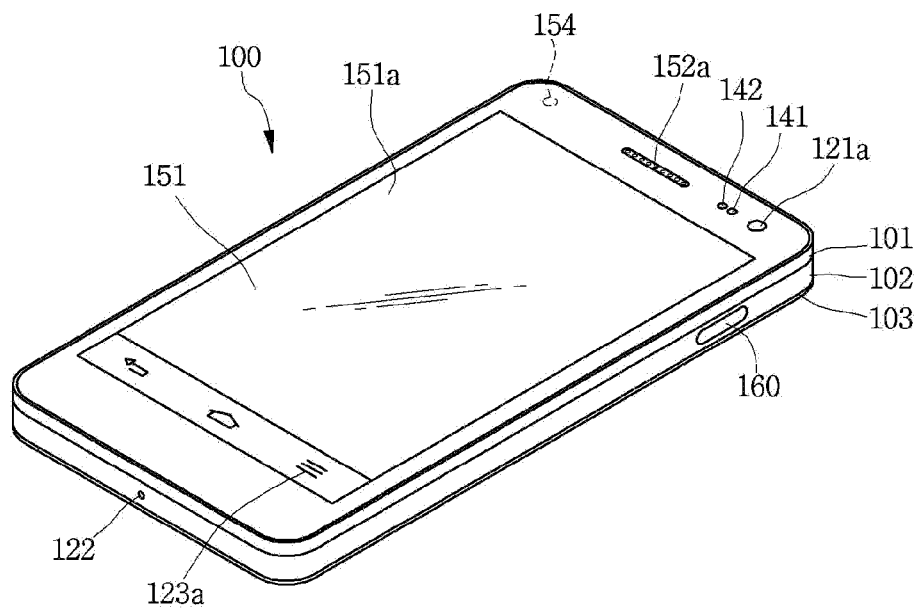
FIG. 2 is a front view of the mobile terminal according to an embodiment.
Figure 3:
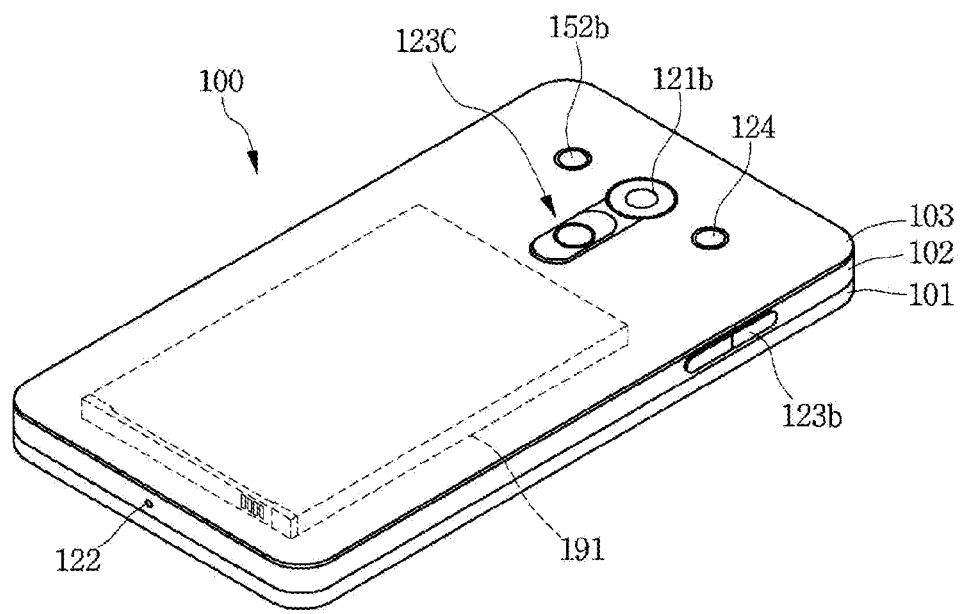
FIG. 3 is a rear view of the mobile terminal according to an embodiment.

FIG. 1 is a block diagram for explaining a mobile terminal according to an embodiment, and FIGS. 2 and 3 are conceptive views illustrating examples of the mobile terminal when viewed in directions different from each other.

Referring to FIGS. 1 to 3, a mobile terminal 100 may include a wireless communication unit 110, an input unit, a sensing unit 140, an output unit 150, an interface unit 160, a memory 170, a controller 180, and a power supply unit 190. The constituents of FIG. 1 are not essential constituents for embodying the mobile terminal. That is, the mobile terminal described in this specification may further include additional constituents in addition to the above-described constituents, or portions of the above-described constituents may be omitted in the mobile terminal described in this specification.

In more detail, the wireless communication unit 110 of the constituents may include at least one module for wirelessly communicating between the mobile terminal 100 and a wireless communication system, between the mobile terminal 100 and the other mobile terminal, or between the mobile terminal 100 and an external server. Also, the wireless communication unit 110 may include at least one module connecting the mobile terminal 100 to at least one network.

The wireless communication unit 110 may include at least one of a broadcast receiving module 111, a mobile communication module 112, a wireless Internet module 113, a short-range communication module 114, and a location information module 115.

The input unit may include a camera 121 or an image input unit for inputting an image signal, a microphone 122 or an audio input unit for inputting an audio signal, and a user input unit 123 (for example, a touch key and a mechanical key) for receiving information from a user. Voice data or image data collected in the input unit 120 may be analyzed and then processed as a control command of the user.

The sensing unit 140 may include at least one sensor for sensing at least one of information within the mobile terminal 100 and surrounding environment information surrounding the mobile terminal 100. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (for example, the camera (see reference numeral 121)), a microphone (see reference numeral 122), a battery gauge, an environment sensor (for example, a barometer, a hygrometer, a thermometer, a radioactive detection sensor, a thermal detection sensor, a gas detection sensor, and the like), and a chemical sensor (for example, an E-nose, a health care sensor, a biometrics sensor, and the like). The mobile terminal disclosed in this specification may utilize information generated by combining information that are sensed by at least two sensors of the above-described sensors.

The output unit 150 may generate a visual, auditory, or haptic output. The output unit 150 may include at least one of a display 151, an audio output module 152, a haptic module 153, and an optical output module 154. The display 151 may form a layered structure together with the touch sensor or be integrated with the touch sensor to realize a touch screen. The touch screen may serve as a user input unit 123 that provides an input interface between the mobile terminal 100 and the user and also provide an output interface between the mobile terminal 100 and the user.

The interface unit 160 may serve as a passage for various kinds of external devices connected to the mobile terminal 100. The interface unit 160 may include at least one of a wired/wireless headset, an external charger port, a wired/wireless data port, a memory card port, a port for connecting a device including an identification module, an audio input/output (I/O) port, a video I/O port, and an earphone port. The mobile terminal 100 may perform a suitable control related to a connected external device when the external device is connected to the interface unit 160.

Also, the memory 170 stores data that supports various functions of the mobile terminal 100. The memory 170 may store a plurality of application programs or applications that are driven in the mobile terminal 100, data for operating the mobile terminal 100, and commands. At least a portion of the application programs may be downloaded from an external server through wireless communication. At least a portion of the application programs may be provided in the mobile terminal 100 from the release of the mobile terminal 100 to realize perform fundamental functions (for example, a phone receiving/transmitting function and a message receiving/transmitting function) of the mobile terminal 100. The application programs may be stored in the memory 170 and installed in the mobile terminal 100 and thus be driven to perform an operation (or function) of the mobile terminal 100 by the controller 180.

The controller 180 may generally control the overall operation of the mobile terminal 100 in addition to the operation related to the application programs. The controller 180 may process signals, data, or information which are inputted or outputted through the above-described constituents or drive the application program stored in the memory 170 to provide or process information or functions suitable for the user.

Also, the controller 180 may control at least a portion of the constituents of FIG. 1 to drive the application programs stored in the memory 170. Furthermore, the controller 180 may combine and operate at least two constituents of the mobile terminal 100 to drive the application program.

The power supply unit 190 may receive power from an external power source or an internal power source under the control of the control unit (180) to supply the power to each of the constituents of the mobile terminal 100. The power supply unit 190 may include a battery. Here, the battery may be a built-in battery or a replaceable battery.

At least a portion of the constituents may cooperate with each other to realize the operation, control, or control method of the mobile terminal according to various embodiments that will be described below. Also, the operation, control, or control method of the mobile terminal 100 may be realized in the mobile terminal 100 by the driving of at least one application program stored in the memory 170.

Referring to FIGS. 2 and 3, the mobile terminal 100 disclosed herein includes a bar-shaped terminal body. However, the present disclosure is not limited thereto. For example, the mobile terminal according to an embodiment may be applied to various structures such as a watch type, a clip type, a glass type, a folding type in which at least two bodies are relative-movably coupled to each other, a flip type, a slide type, a swing type, a swivel type, and the like. A specific type of mobile terminals or description with respect to the specific type of mobile terminals may be generally applied to different types of mobile terminals.

Here, the terminal body may be understood as a concept that is called at least one assembly of the mobile terminal 100.

The mobile terminal 100 includes a case (for example, a frame, a housing, and a cover) defining an outer appearance thereof. As illustrated in FIGS. 2 and 3, the mobile terminal 100 may include a front case 101 and a rear case 102. Various electronic components may be disposed in an inner space that is defined by coupling the front case 101 and the rear case 102. At least one middle case may be additionally disposed between the front case 101 and the rear case 102.

The electronic components may be mounted on the rear case 102. The electronic components that are capable of being mounted on the rear case 102 may include a detachable battery, an identification module, and a memory card. In this case, a rear surface case 103 for covering the mounted electronic components may be detachably coupled to the rear case 102. Thus, when the rear surface case 103 is separated from the rear case 102, the electronic components mounted on the rear case 102 are exposed to the outside. That is to say, the rear surface case 103 may be detachably coupled to a rear surface of an assembly of the front case 101 and the rear case 102.

When the rear surface case 103 is coupled to the rear case 102, a portion of a side surface of the rear case 102 may be exposed. In some case, when the rear surface case 103 is coupled, the rear case 102 may be completely covered by the rear surface case 103. An opening for exposing a camera 121b or an audio output module 152b may be defined in the rear surface case 103.

Hereinafter, for convenience of description, the assembly formed by coupling the front case 101, the rear case 102, and the rear surface case 103 to each other may be defined as the terminal body 100a. Hereinafter, a reference numeral may be given to the terminal body 100a to describe the terminal body 100a. The terminal body 100a may have a front surface.

The mobile terminal may include a window 151a. The window 151a is disposed at the front surface of the terminal body 100a, the window 151a has a front surface and a rear surface.

The window 151a may be mounted on the front case 101 to define a front surface of the terminal body 100a together with the front case 101. The display 151 may be disposed on a rear surface of the window 151a to output an image through the window 151a.

The window 151a and the display 151 may be mounted on the front surface of the terminal body 100a.

Each of the cases 101, 102, and 103 constituting the terminal body 100a may be injection-molded by using a synthetic resin or be formed of metal, for example, stainless steel (STS), aluminum (Al), titanium (Ti), and the like.

In the mobile terminal 100, unlike that the plurality of cases define the inner space for accommodating the various electronic components, the inner space may be defined by using one case. In this case, the mobile terminal 100 including a uni-body in which the synthetic resin or metal is continuously formed from a side surface to a rear surface may be realized.

The mobile terminal 100 may include a waterproof part for preventing water from being permeated into the terminal body 100a. For example, the waterproof part may include a waterproof member that is disposed between the window 151a and the front case 101, between the front case 101 and the rear case 102, or between the rear case 102 and the rear surface case 103 to seal the inner space when the above-described cases are coupled to each other.

The mobile terminal 100 may include the display 151, first and second audio output modules 152a and 152b, a proximity sensor 141, an illumination sensor 142, an optical output module 154, first and second cameras 121a and 121b, first to third manipulation units 123a, 123b, and 123c, a microphone 122, and an interface unit 160.

Hereinafter, as illustrated in FIGS. 2 and 3, the mobile terminal 100 in which the display 151, the first audio output module 152a, the proximity sensor 141, the illumination sensor 142, the optical output module 154, the first camera 121a, the first manipulation unit 123a are disposed on the front surface of the terminal body 100a, and the second manipulation unit 123b, the microphone 122, and the interface unit 160 may be disposed on the side surface of the terminal body 100a, and the second audio output module 152b, the second camera 121b, the third manipulation unit 123c, and a flash 124 are disposed on the rear surface of the terminal body 100a is described as an example.

However, the constituents are not limited to the above-described location. As necessary, each of the constituents may be omitted, replaced, or disposed on the other surface. For example, the first manipulation unit 123a may not be disposed on the front surface of the terminal body 100a, and the second audio output module 152b may not be disposed the rear surface of the terminal body 100a, but be disposed on the side surface of the terminal body 100a.

The display 151 displays (outputs) information that is processed in the mobile terminal 100. For example, the display 151 may display execution screen information driven in the mobile terminal 100 or user interface (UI) or graphic user interface (GUI) information according to the execution screen.

The display 151 may include at least one of a liquid crystal display (LCD), a thin film transistor-liquid crystal display (TFT LCD), an organic light-emitting diode (OLED), a flexible display, a 3D display, and an E-ink display.

Also, at least two displays 151 may be provided according to the realization configuration of the mobile terminal 100. In this case, in the mobile terminal 100, the plurality of displays may be disposed on one surface so as to be separated from each other or be integrally disposed on the one surface. Also, the displays may be disposed on surfaces different from each other.

The display 151 may receive a control command in a touch manner or include a touch sensor for detecting touch on the display 151. Thus, when the touch is performed on the display 151, the touch sensor may detect the touch, and the controller 180 may generate a control command corresponding to the touch according to the touch on the display 151. Contents inputted by the touch manner may include characters or figures or menu items that are capable of being indicated or designated in various modes.

The touch sensor may have a film shape including a touch pattern and be disposed between the window 151a and a display on the rear surface of the window 151a. Alternatively, the touch sensor may be a metal wire that is directly patterned on the rear surface of the window 151a. Alternatively, the touch sensor may be integrated with the display. For example, the touch sensor may be disposed on a substrate of the display or within the display.

As described above, the display 151 may form a touch screen together with the touch sensor. In this case, the touch screen may function as a user input unit (see reference numeral 123 of FIG. 3). In some cases, the touch screen may substitute at least a portion of functions of the first manipulation unit 123a.

The first audio output module 152a may be realized as a receiver that transmits a call sound to a user's ear. The second audio output module 152b may be realized as a loud speaker that outputs various alarm sounds or multimedia play sounds.

An audio hole for releasing sounds generated from the first audio output module 152a may be defined in the window 151a of the display 151. However, the present disclosure is not limited thereto. For example, the sounds may be released along an assembly gap (for example, a gap between the window 151a and the front case 101) between structures. In this case, the hole that is independently formed to output sounds may be unseen or hid, and thus the mobile terminal may be more simplified in outer appearance.

The optical output module 154 may output light for informing an occurrence of an event. Examples of the event may include message reception, call signal reception, unanswered call, alarm, schedule notification, email reception, information reception through application. The controller 180 may control the optical output module 154 to stop the output of the light when the user's event confirmation is detected.

The first camera 121a processes an image frame of a static image or moving picture, which is obtained by an image sensor in a photograph mode or videotelephony mode. The processed image frame may be displayed on the display 151 and then stored in the memory 170.

The first and second manipulation units 123a and 123b may be one example of the user input unit 123 that is manipulated to receive a command for controlling an operation of the mobile terminal 100 and be called a manipulating portion. The first and second manipulation units 123a and 123b may be adopted in various tactile manners in which a manipulation unit is capable of being manipulated to receive tactile feels such as touch, push, scroll, and the like. Also, the first and second manipulation units 123a and 123b may be adopted in a manner in which a manipulation unit is manipulated without tactile feel of the user through proximity touch, hovering, and the like.

In this drawing, although the first manipulation unit 123a is provided as the touch key, the present disclosure is not limited thereto. For example, the first manipulation unit 123a may be provided as the mechanical key or a combination of the touch key and the mechanical key.

Contents inputted by the first and second manipulation units 123a and 123b may be various set. For example, the first manipulation unit 123a may receive commands such as menu, home key, cancel, and search, and the second manipulation unit 123b may receive commands for adjustment in intensity of sound outputted from the first and second audio output modules 152a and 152b and conversion into a touch recognition mode of the display 151.

A third manipulation unit 123c may be disposed on the rear surface of the terminal body 100a as another example of the user input unit 123. The third manipulation unit 123c may be manipulated to receive a command for controlling the operation of the mobile terminal 100. Here, the input contents may be variously set. For example, the third manipulation unit 123c may receive commands such as turn on/off of power, start, end, and scroll and commands such as adjustment in intensity of sound outputted from the first and second audio output modules 152a and 152b and conversion into a touch recognition mode of the display 151. The third manipulation unit 123c may be realized in a shape in which the touch input, the push input, or a combination thereof is enabled.

The third manipulation unit 123c may be disposed to overlap the display 151 disposed on the front surface of the terminal body 100a in a thickness of the terminal body 100a. For example, when the user holds the terminal body 100a by using one hand, the third manipulation unit 123c may be disposed on an upper end of the rear surface of the terminal body 100a so that the user manipulates the third manipulation unit 123c by using an index finger. However, the present disclosure is not limited thereto. For example, the third manipulation unit 123c may be changed in position.

When the third manipulation unit 123c is disposed on the rear surface of the terminal body 100a, a new user interface using the third manipulation unit 123c may be realized. Also, the touch screen or the third manipulation unit 123c, which are described above may perform at least a portion of the functions of the first manipulation unit 123a disposed on the front surface of the terminal body 100a. As a result, when the first manipulation unit 123a is not disposed on the front surface of the terminal body 100a, the display 151 may have a larger screen.

The mobile terminal 100 may include a fingerprint recognition sensor for recognizing a fingerprint of the user. The controller 180 may use fingerprint information detected through the fingerprint recognition sensor as an identification unit. The fingerprint recognition sensor may be built in the display 151 or the user input unit 123.

The microphone 122 may receive user's voice and other sounds. The microphone 122 may be provided in plurality to receive stereo sounds.

The interface unit 160 may serve as a passage for connecting the mobile terminal 100 to the external device. For example, the interface unit 160 may include at least one of a connection terminal for connecting the other device (e.g., an earphone, an external speaker, and the like), a port for short-range communication (e.g., an infrared port (IrDA port), Bluetooth port, wireless LAN port, and the like), and a power supply terminal for supplying a power to the mobile terminal 100. The interface unit 160 may be realized in the form of a socket that is capable of accommodating a subscriber identification module (SIM) or user identity module (UIM) and an external card such as a memory card for storing information.

The second camera 121b may be disposed on the rear surface of the terminal body 100a. In this case, the second camera 121b may photograph a side substantially opposite to that photographed by the first camera 121a.

The second camera 121b may include a plurality of lenses that are arranged along at least one line. The plurality of lenses may be arranged in a matrix form. The camera may be called an "array camera". When the second camera 121b is provided as the array camera, the second camera 121b may photograph a subject in various manners by using the plurality of lenses to acquire more improved images.

The flash 124 may be disposed adjacent to the second camera 121b. The flash 124 may irradiate light toward a subject when the subject is photographed by using the second camera 121b.

The second audio output module 152b may be additionally disposed on the terminal body 100a. The second audio output module 152b may perform a stereo function together with the first audio output module 152a. When making a call, the second audio output module 152 may be used for realizing a speakerphone mode.

At least one antenna for wireless communication may be disposed on the terminal body 100a. The antenna may be built in the terminal body 100a or disposed on the terminal body 100a. For example, the antenna constituting a portion of a communication receiving module (see reference numeral 111 of FIG. 1) may be withdrawably disposed in the terminal body 100a.

The power supply unit (see reference numeral 190 of FIG. 1) for supplying a power to the mobile terminal 100 is disposed on the terminal body 100a. The power supply unit 190 may be built in the terminal body 100a or include a battery 191 that is detachably disposed on an outer portion of the terminal body 100a.

The battery 191 may receive a power through a power cable connected to the interface unit 160. Also, the battery 191 may be wirelessly charged through a wireless charger. The wireless charging may be realized by a magnetic induction manner or resonant manner (magnetic resonance manner).

In the drawings, the rear surface case 103 is coupled to the rear case 102 to cover the battery 191, thereby preventing the battery 192 from being separated and protecting the battery 192 against an external impact and foreign substances. When the battery 191 is detachably disposed on the terminal body 100a, the rear surface case 103 may be detachably coupled to the rear case 102.

An accessory for protecting the outer appearance of the mobile terminal 100 or assisting or expanding the functions of the mobile terminal 100 may be additionally disposed on the mobile terminal 100. Examples of the accessory may include a cover or pouch for covering or accommodating at least one surface of the mobile terminal 100. The cover or pouch may communicate with the display 151 to expand the functions of the mobile terminal 100.

Hereinafter, an external cover for protecting the mobile terminal 100 will be described.

Figure 4:
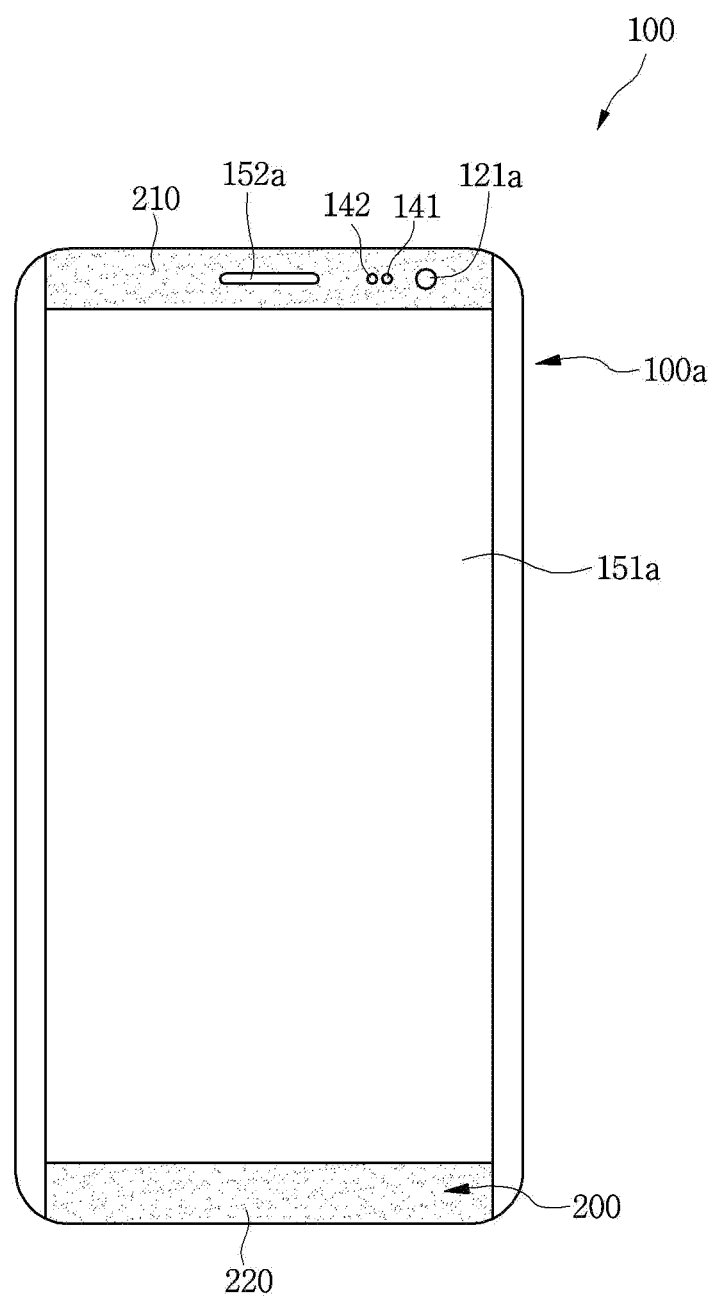
FIG. 4 is a front view of the mobile terminal according to an embodiment.
Figure 5:
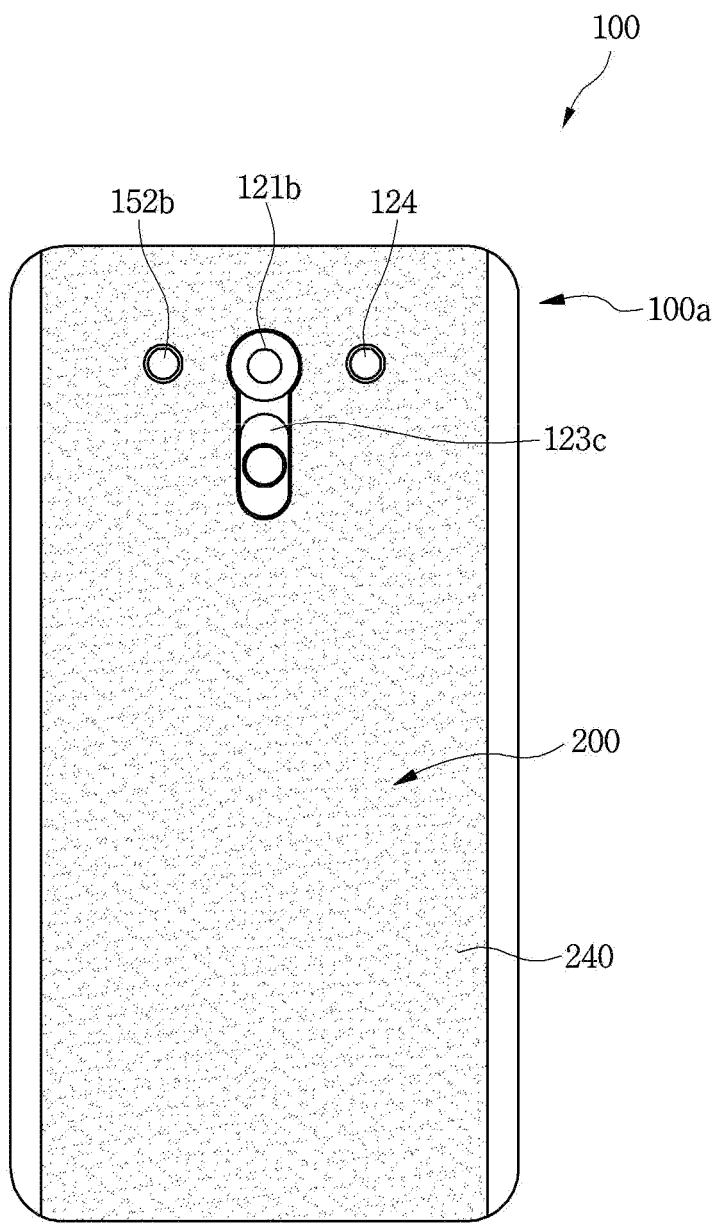
FIG. 5 is a rear view of the mobile terminal according to an embodiment.
Figure 6:
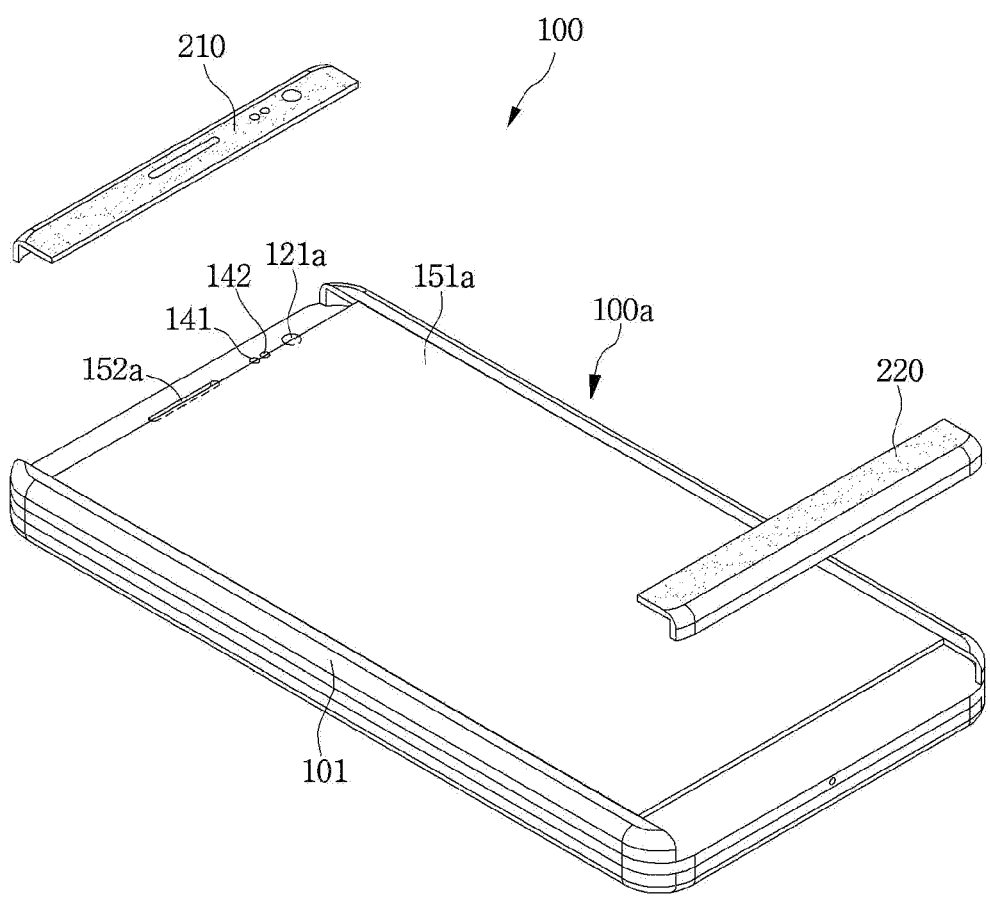
FIG. 6 is an exploded perspective view of an external cover and the mobile terminal according to an embodiment.
Figure 7:
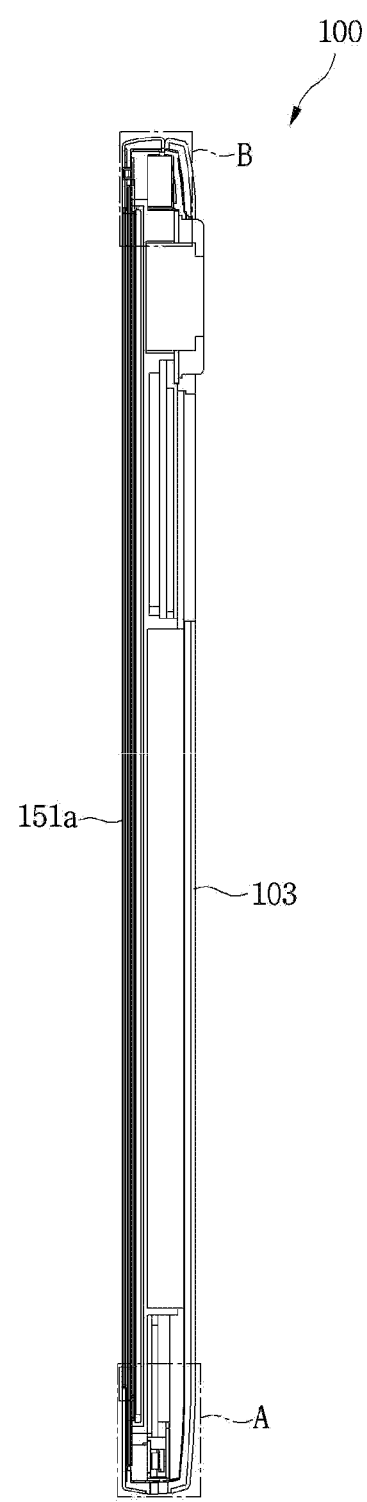
FIG. 7 is a side cross-sectional view of the mobile terminal according to an embodiment.

FIG. 4 is a front view of the mobile terminal according to an embodiment, FIG. 5 is a rear view of the mobile terminal according to an embodiment, FIG. 6 is an exploded perspective view of the external cover and the mobile terminal according to an embodiment, and FIG. 7 is a side cross-sectional view of the mobile terminal according to an embodiment.

Referring to FIGS. 4 to 7, the mobile terminal 100 according to an embodiment includes an external cover 200 coupled to the terminal body 100a defining the outer appearance of the mobile terminal 100 to protect the outer appearance of the terminal body 100a.

The external cover 200 may be coupled to an outer surface of the terminal body 110a to protect an outer appearance of the terminal body 110a, the external cover 200 may include a front cover that covers at least one outer surface of a top surface of the terminal body, a bottom surface of the terminal body, a left of the terminal body, or a right surface of the terminal body and a portion of the front surface of the window 151a.

The front covers 210 and 220 may cover an outer surface of the terminal body 100a, i.e., an outer surface of the front case 101 and an outer surface of the rear case 102 and a portion of the front surface of the window 151a.

The external cover 200 may further include a rear cover 240 coupled to the rear surface of the terminal body 100a to cover the rear surface of the terminal body 100a. The rear cover 240 may be coupled to a rear surface of the rear surface case 103 to cover a rear surface of the rear surface case 103. The rear cover 240 may be coupled to the rear surface case 103 to cover the entire rear surface of the rear surface case 103. An exposing hole for exposing the second audio output module 152b, the second camera 121b, the third manipulation unit 123c, and the flash 124, which are disposed on the rear surface of the terminal body 100a, to the outside may be defined in the rear cover 240.

The front covers 210 and 220 includes a first cover 210 for covering one side surface of the outer surface of the terminal body 100a and one side of the front surface of the window 151a and a second cover 220 for covering the other side surface of the outer surface of the terminal body 100a and the other side of the front surface of the window 151a. The first cover 210 and the second cover 220 may be vertically disposed symmetric to each other. As illustrated in FIG. 6, the first cover 210 may cover the top surface of the terminal body 100a and an upper front surface of the window 151a, and the second cover 220 may cover the bottom surface of the terminal body 100a and a lower front surface of the window 151a. On the other hand, the first and second covers 210 and 220 may be horizontally disposed symmetric to each other. The first cover 210 may cover the left surface and a left front surface of the terminal body 100a, and the second cover 220 may cover the right surface and a right front surface of the terminal body 100a.

Since the terminal body 100a includes the front case 101 and the rear case 102, the front covers 210 and 220 may be vertically disposed to surround the outer surface of the terminal body 100a from the front surface of the terminal body 100a including the window 151a. However, the rear case 102 of the terminal body 100a may not be exposed to the outside of the mobile terminal 100. In this case, the front covers 210 and 220 may be coupled to cover each of an upper front surface, a lower front surface, a top surface, and a bottom surface of the front case 101.

The external cover 200 may be manufactured by using a material having a soft and easily deformable characteristic such as natural leather, synthetic leather, or fabric. In some cases, the external cover 200 may have inner and outer surfaces, which are formed of materials different from each other. The inner surface may be formed of a soft material so that the inner surface is easily attached, and the outer surface may be formed of a leather material. Thus, even though the external cover 200 is coupled to the outside of the terminal body 100a, the mobile terminal 100 may not be increased very much in thickness to maintain user's grip feeling with respect to the mobile terminal 100.

When the external cover 200 includes all of the front covers 210 and 220 and the rear cover 240, all of the upper front surface, the top surface, the lower front surface, the bottom surface, and the rear surface of the terminal body 100a may be covered. Thus, the external cover 200 may maximally increase an area for protecting the mobile terminal 100 against the external impact or the foreign substances.

Hereinafter, a coupling structure of the front covers 210 and 220 and the front case 101 will be described.

Figure 8:
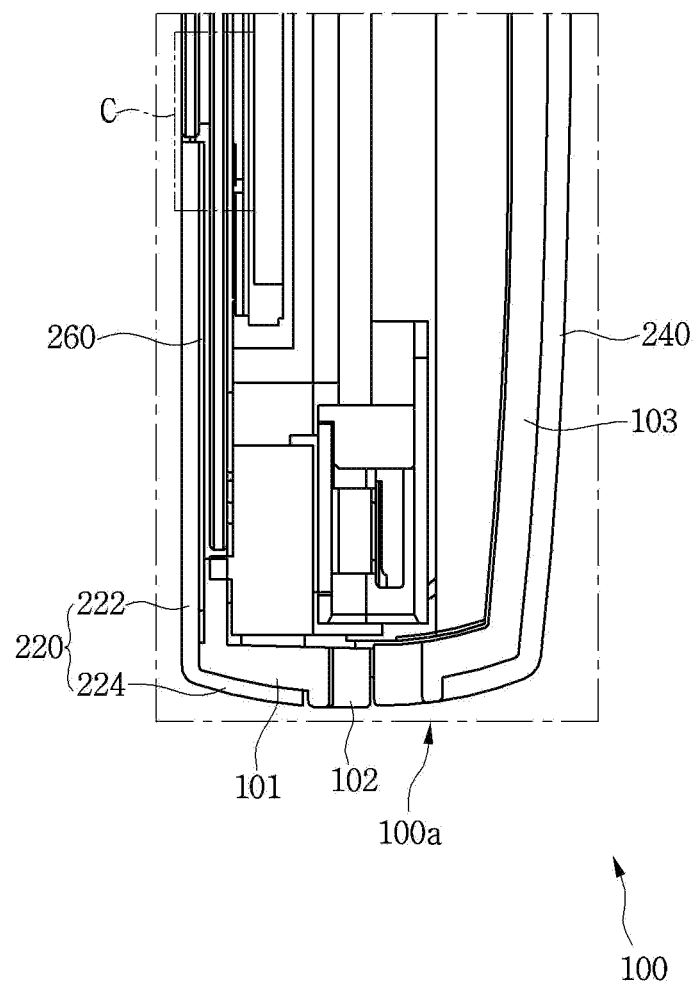
FIG. 8 is an enlarged cross-sectional view of a portion A of FIG. 7.
Figure 9:
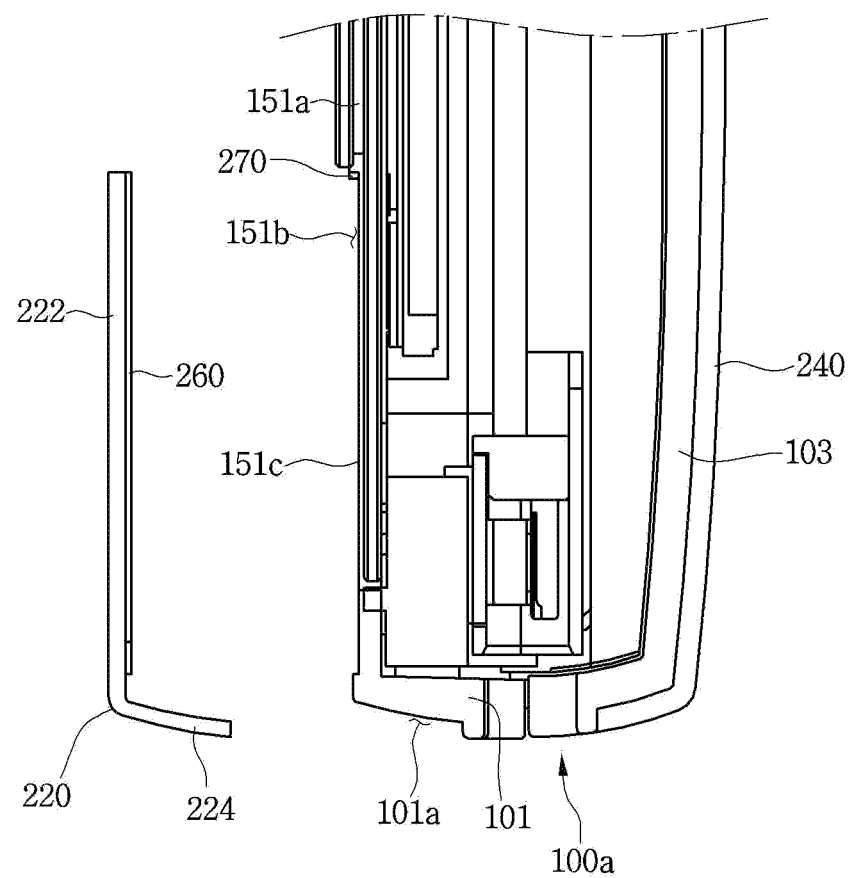
FIG. 9 is an exploded cross-sectional view of a front cover and the mobile terminal according to an embodiment.
Figure 10:
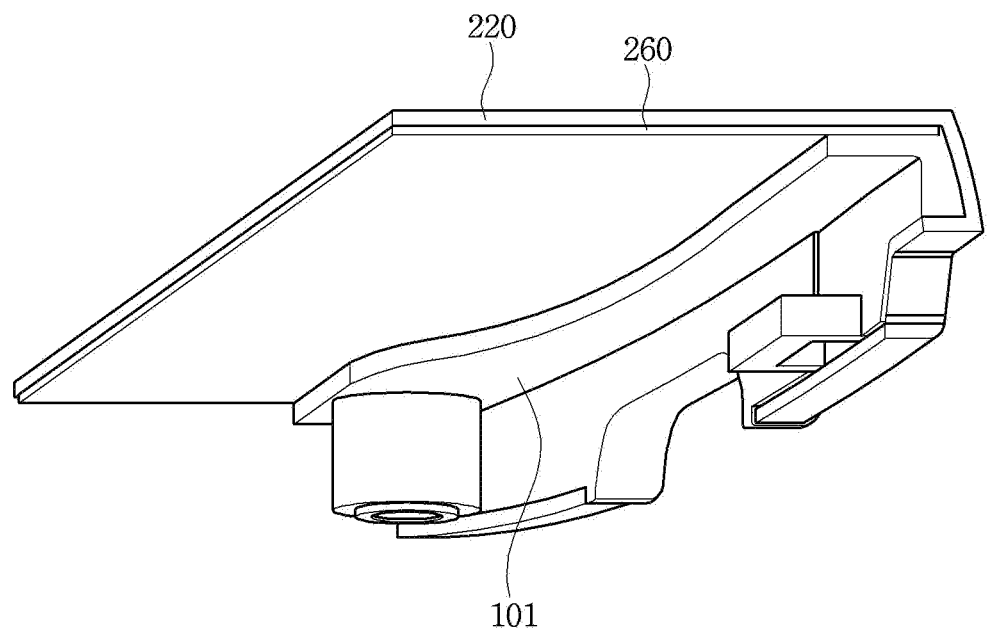
FIG. 10 is a perspective view of a state in which a front case and the front cover are coupled to each other according to an embodiment.
Figure 11:
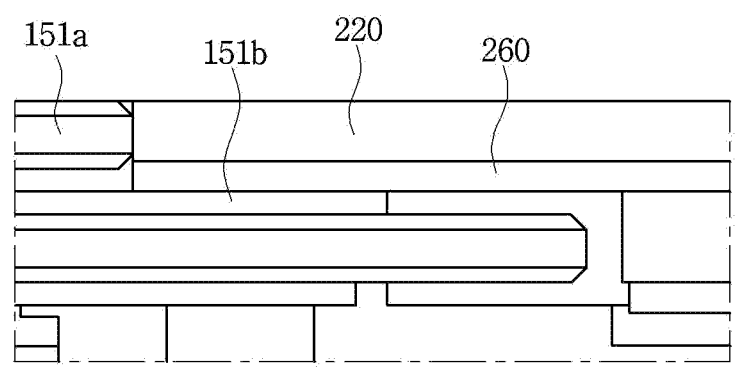
FIG. 11 is an enlarged view of a portion C of FIG. 8.
Figure 12:
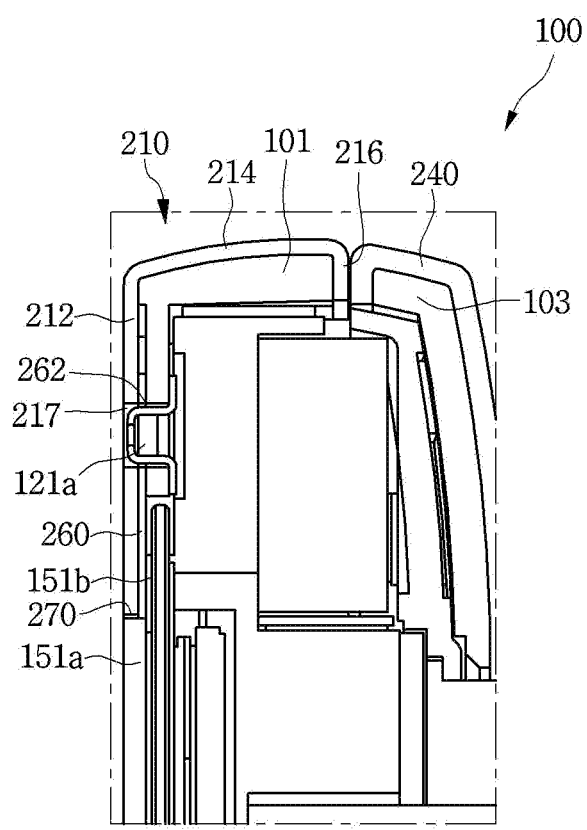
FIG. 12 is a cross-sectional view of a region B of FIG. 7.

FIG. 8 is an enlarged cross-sectional view of a portion A of FIG. 7, FIG. 9 is an exploded cross-sectional view of the front cover and the mobile terminal according to an embodiment, FIG. 10 is a perspective view of a state in which the front case and the front cover are coupled to each other according to an embodiment, and FIG. 11 is an enlarged view of a portion C of FIG. 8. FIG. 12 is a cross-sectional view of a region B of FIG. 7.

The first cover 210 and the second cover 220 may include a main body for covering the front surface of the window 151a and a covered part that is covered backward from an end of the body to cover the top surface of the terminal body 100a or the bottom surface of the terminal body 100a.

A coupling groove that is recessed backward by a predetermined distance to form a stepped portion with respect to the other area may be defined in an area of the front surface of the window 151a, which is coupled to the body. The main body may be seated in the coupling groove.

A coupling sheet that provides an adhesion force on both surfaces thereof to allow a seating surface of the coupling groove and a rear surface of the main body to adhere thereto may be disposed between the coupling groove and the main body. The coupling sheet may be formed of a material having relatively high rigidity than that of the main body. At least one through hole may be defined in the coupling sheet to pass through front and rear surfaces of the coupling sheet. The sum of a thickness of the coupling sheet and a thickness of the main body may correspond to a recessed height of the coupling groove.

An adhesion part for coupling the end of the main body to the window 151a may be disposed on an area on which the stepped portion of the window 151a is formed. The adhesion part may be epoxy that is applied to the area on which the stepped portion of the window 151a is formed.

Referring to FIGS. 8 to 11, the second cover 220 includes a first body 222 for covering the front surface of the mobile terminal 100 and a first covered part 224 that is curved from an end of the first body 222 to a rear side of the terminal body 100a to cover the outer surface of the front case 101.

A coupling groove 151b that is recessed backward may be defined in an area of the front surface of the window 151a to which the first body 222 is coupled. The coupling groove 151b may be stepped from the other area on the front surface of the window 151a. The first body 222 is coupled to the coupling groove 151b. That is, the first body 222 is placed on the seating surface 151c of the coupling groove 151b. The display 151 for outputting an image is disposed at a rear side of the window 151a, and the display 151 has to have a length less than that of the window 151a to output the image. Thus, in the current embodiment, the coupling groove 151b that is a stepped area may be defined in the window 151a to maintain a ratio of the window 151a to the display 151, thereby securing a space in which the electronic components are disposed in a rear space of the window 151a. That is to say, the first body 222 may be coupled to the front surface of the window 151a to allow the window 151a to have a length greater than that of the display 151.

An adhesion part 270 for coupling the end of the first body 222 to the stepped area of the window 151a may be disposed on the area of the front surface of the window 151a on which the stepped portion is formed. Since the end of the first body 222 has relatively weak adhesion force than that of the other area, the adhesion part 270 may be disposed on the end area to prevent the first body from being lifted. For example, the adhesion part 270 may be epoxy that is applied to the area on which the stepped portion of the window 151a is formed. Also, a coupling sheet 260 to be coupled to the rear surface of the first body 222 is disposed at a rear side of the first body 222. The coupling sheet 260 may be formed of a material having relatively high rigidity than that of the first body 222. Thus, the first body 222 may be firmly coupled to the seating surface 151c. Also, the sum of a thickness of the coupling sheet 260 and a thickness of the first body 222 may correspond to a height of the coupling groove 151b. Thus, the first body 222 may form a sense of unity with the window 151a on the front surface of the mobile terminal 100.

An adhesive for providing the adhesion force to each of the seating surface 151c and the rear surface of the first body 222 may be applied on both side surfaces of the coupling sheet 260.

Also, the first curved part 224 is curved backward from a lower end of the first body 222 to cover the bottom surface of the front case 101. A coupling groove 101a into which the first curved part 224 is inserted may be defined in the bottom surface of the front case 101. Since the first curved part 224 is seated in the coupling groove 101a, a sense of unity with the other area of the front case 101 may be provided.

A user manipulation unit for inputting a user's manipulation command through the touch may be disposed on the lower front surface of the window 151a that is covered by the external cover 200. When the user touches a top surface of the external cover 200, a manipulation command may be inputted to the user manipulation unit.

A touch screen for the user manipulation may be disposed on the front surface of the window 151a that is covered by the first body 222 of the second cover 220.

In the external cover 200, the first body 222 of the second cover 220 may cover the lower front surface of the window 151a, and the first body 220 of the second cover 222 may be touched to perform the touch input of the user manipulation unit.

The manipulation command inputted by touching the top surface of the first body 222 by the user may be transmitted to the touch screen through the first body 222 to perform an operation of the mobile terminal 100, which corresponds to the user input.

Referring to FIG. 12, the first cover 210 may include a second body 212 for covering the front surface of the mobile terminal 100 and a second curved part 214 that is covered from an end of the second body 212 to a rear side of the mobile terminal 100 to cover the top surface of the front case 101. The first cover 210 may include a bent part 216 that is bent from an end of the second cover part 214 to cover a portion of the rear surface of the front case 101.

A coupling groove 151b that is recessed backward may be defined in an area of the front surface of the window 151a to which the second body 212 is coupled. The coupling groove 151b may be stepped from the other area on the front surface of the window 151a. The second body 212 is coupled to the coupling groove 151b. Like the first body 212, an adhesion part 270 may be disposed on the stepped area of the window 151a to which the end of the second body 212 is coupled.

Also, a coupling sheet 260 coupled to the rear surface of the second body 212 may be disposed at a rear side of the second body 212. Thus, the sum of thicknesses of the second body 212 and the coupling sheet 260 may correspond to a height of the coupling groove 151b. Also, the front surface of the mobile terminal 100 may have a sense of unity.

The mobile terminal may include a constituent (e.g., the camera 121a) that passes through the second body 212 and the coupling sheet 260 at the same time and is disposed on the front surface of the mobile terminal 100. Exposing holes 217 and 262 for exposing the constituent 121a disposed on the front surface of the mobile terminal 100 as described above may be defined in the second body 212 and the coupling sheet 260. The through hole 262 of the coupling sheet 260 may be the exposing hole for exposing the constituent (e.g., the camera 121a) disposed on the front surface of the mobile terminal 100 to the outside.

The coupling groove (the first coupling groove) into which the first cover 210 is inserted and coupled is defined in the upper portion of the window 151a according to the current embodiment so as to be recessed backward by a predetermined distance. In addition, the coupling groove (the second coupling groove) into which the second cover 220 is inserted and coupled may be defined in the lower portion of the window 151a so as to be recessed backward by a predetermined distance. In the window 151a, the other area disposed between the coupling groove (the first coupling groove) defined in the upper portion of the window 151a and the coupling groove (the second coupling groove) defined in the lower portion of the window 151a together with each of the coupling grooves may form the stepped portion. Thus, the other area may not be covered by the external cover 200, but be exposed to the outside.

Figure 13:
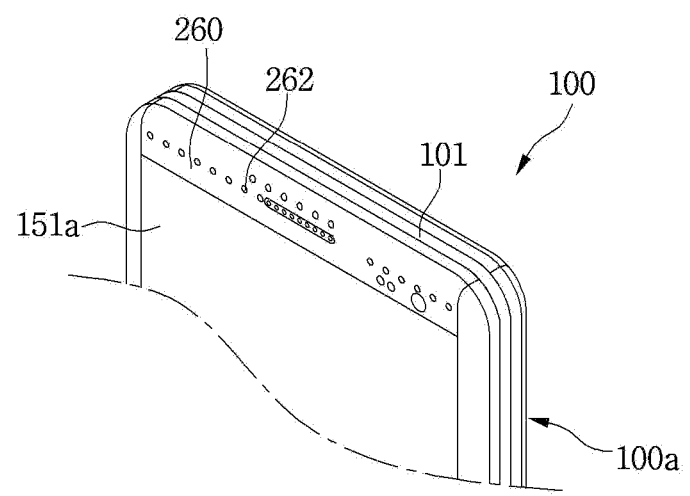
FIG. 13 is a perspective view of a state in which a coupling sheet and the front case are coupled to each other according to an embodiment.

FIG. 13 is a perspective view of a state in which the coupling sheet and the front case are coupled to each other according to an embodiment.

Referring to FIG. 13, a through hole 262 passing through front and rear surfaces of the coupling sheet 260 may be defined in the coupling sheet 260. The through hole 262 may be provided in plurality in the coupling sheet 260. The plurality of through holes 262 may be spaced apart from each other.

An adhesive for coupling the coupling sheet 260 to the front case 101 may be applied to the rear surface of the coupling sheet 260 or the seating surface 151c of the coupling groove 151b. Thus, in the current embodiment, since the through hole 262 is defined in the coupling sheet 260, and a portion of the applied adhesive is seated and coagulated on an inner surface of the through hole 262, the coupling sheet 260 and the front case 101 may be firmly coupled to each other.

Although the coupling between the external cover 200 and the mobile terminal 100 is described above, those skilled in the art may adequately combine the coupling methods so that a portion of the external cover 200 covers a portion of the front surface of the mobile terminal 100, and also, this combination may be belong to the present disclosure.

Figure 14:
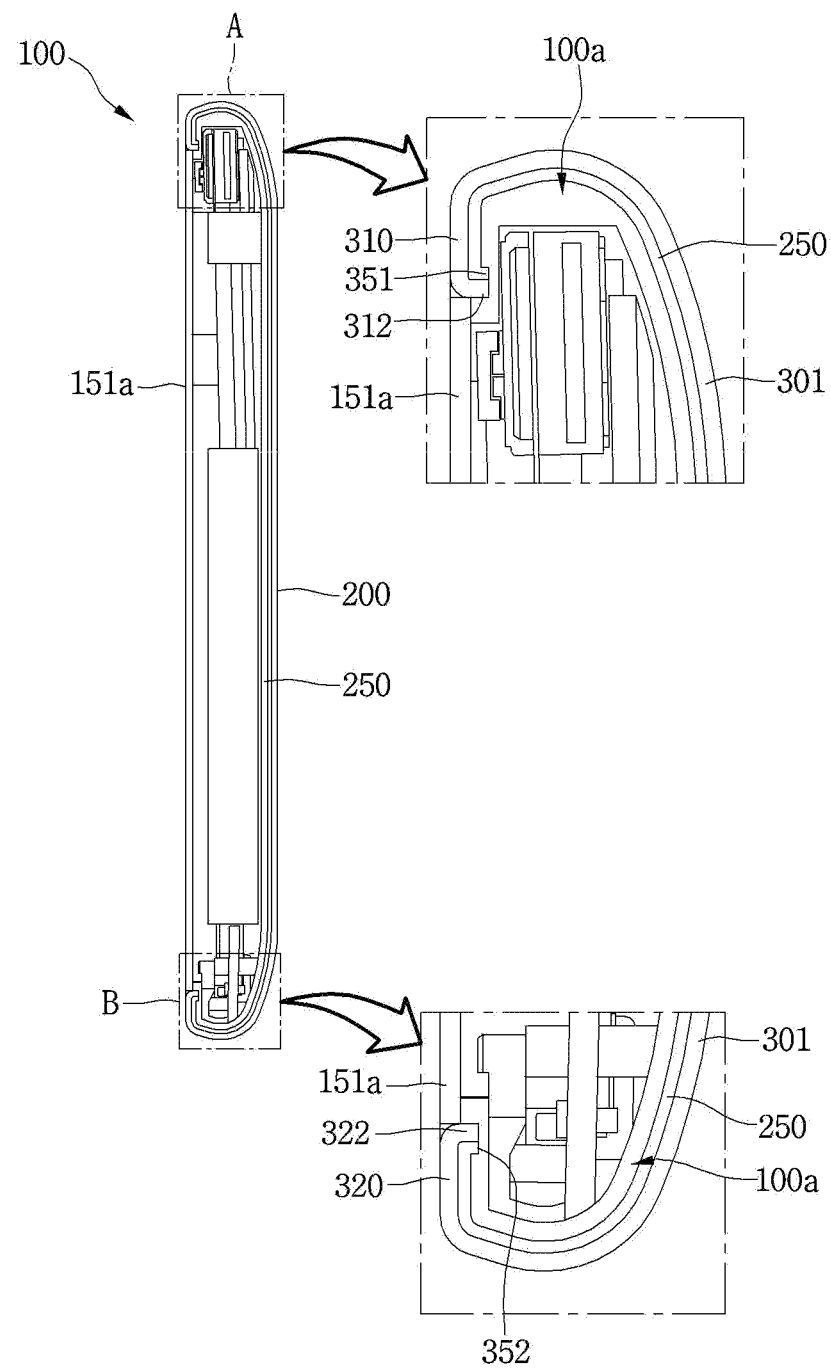
FIG. 14 is a side cross-sectional view of a mobile terminal according to another embodiment.
Figure 15:
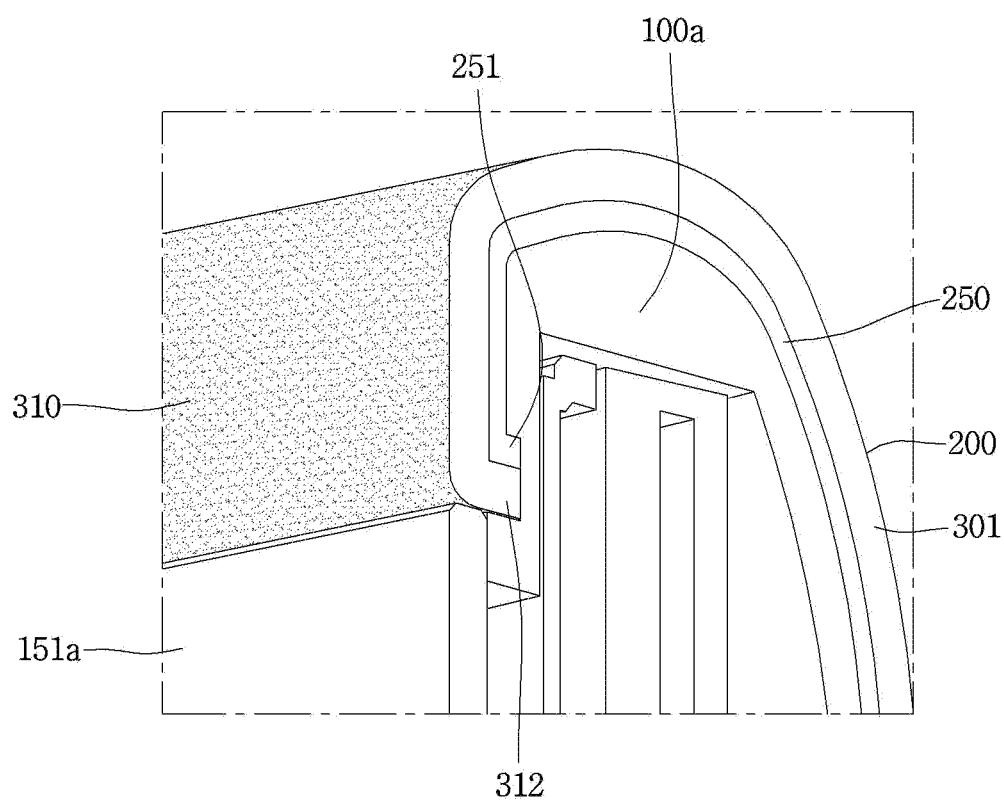
FIG. 15 is s perspective view of a portion A of FIG. 14.

FIG. 14 is a side cross-sectional view of a mobile terminal according to another embodiment, and FIG. 15 is s perspective view of a portion A of FIG. 14.

Referring to FIGS. 14 and 15, a mobile terminal 100 in the current embodiment may include an external cover 200 and an appearance sheet 250. The external cover 200 and the appearance sheet 250 may have a structure and effect that are equal or similar to those according to the foregoing embodiment, and thus, their duplicated description will be omitted, and the same reference numeral may be given.

The external cover 200 may be disposed outside a terminal body 100a and define a portion of an outer appearance of the mobile terminal 100. The external cover 200 may define a portion of the outer appearance of the mobile terminal. A window 151a and the terminal body 100a may define the remaining outer appearance of the mobile terminal.

The external cover 200 may include a main body 301 disposed at a rear side of a rear surface of the terminal body 100a and extension parts 310 and 320 extending from the main body to a front side of the terminal body 100a to cover a portion of a front surface of the terminal body 100a.

The extension parts 310 and 320 may include an upper extension part 310 disposed above the window 151a and the terminal body 100a and a lower extension part 320 disposed under the window 151a and the terminal body 100a.

The upper extension part 310 may include a top surface extension part that is bent from an upper end of the main body 301 and then disposed above the terminal body 100a and a front surface upper extension part extending from the top surface extension part downward. Also, the lower extension part 320 may include a bottom surface extension part that is bent from a lower end of the main body 301 and then disposed under the terminal body 100a and a front surface lower extension part extending from the bottom surface extension part upward.

The appearance sheet 250 may be disposed between the external cover 300 and the terminal body 100a to define an outer appearance of the external cover 200. The external cover 200 may be supported by the appearance sheet 250 and thus maintained in outer appearance thereof. The appearance sheet 250 may have one surface that is coupled to the terminal body 100a and the other surface that is coupled to the external cover 200. The appearance sheet 250 may be coupled to an inner surface of the external cover 200 to maintain a shape of the external cover 200 outside the terminal body 100a.

The external cover 200 may be formed of a soft material. If the external cover 200 is directly coupled to the terminal body 100a, coupling force therebetween may be weak. That is, even though an adhesive is applied to the entire inner surface of the external cover 200 or an edge of the external cover 200, if an object for supporting the external cover 200 is not provided, the coupling process may be difficult, and also, creases may be generated on the external cover 200.

Thus, in the current embodiment, the appearance sheet 250 for defining the outer appearance of the external cover 200 may be disposed between the terminal body 100a and the external cover 200 to firmly maintain the coupled state of the external cover 200 on the terminal body 100a. The appearance sheet 250 may serve as an external cover support for supporting the external cover 200.

The appearance sheet 250 may have an outer surface corresponding to a shape of the inner surface of the external cover 200. Thus, the entire outer surface of the appearance sheet 250 may adhere to the entire inner surface of the external cover 200.

Also, the appearance sheet 250 may be formed of a material having relatively higher rigidity than that of the external cover 200 to reinforce the rigidity of the external cover 200. For example, the appearance sheet 250 may be formed of a material that is selected from the group consisting of carbon fiber-reinforced plastic (CFRP), class fiber-reinforced plastic, and metal. Thus, since tension force is applied to the external cover 200 so that an edge of the external cover 200 is away from the outside of the terminal body 100a by the appearance sheet 250, the firmly coupled state may be maintained.

A process in which the appearance sheet 250 and the external cover 200a are coupled to each other will be described below.

The external cover 200 further include bent parts 312 and 322 that are bent from ends of the extension parts 310 and 320 to the rear side of the mobile terminal 100. The bent parts 312 and 322 may be bent from an end of the upper extension part 310 disposed on an upper portion of the front surface of the terminal body 100a to the rear side of the terminal body 100a and bent from an end of the lower extension part 320 disposed on a lower portion of the front surface of the terminal body 100a to the rear side of the mobile terminal 100.

The bent part that is bent from the end of the upper extension part 310 may be an upper bent part 312, and the bent part that is bent from the end of the lower extension part 320 may be a lower bent part 322. The upper bent part 312 and the lower bent part 322 may be vertically spaced apart from each other to define a space therebetween.

The window 151a may be disposed on an area that is defined by the upper bent part 312 and the lower bent part 322. That is to say, the window 151a may have an upper end that contacts an outer surface of the upper bent part 312 and a lower end that contacts an outer surface of the lower bent part 322. A portion of the front surface of the mobile terminal 100 may be defined between the upper bent part 312 and the lower bent part 322.

Thus, an area of the front surface of the mobile terminal 100 except for the window 151a may be covered by the external cover 200, and an area to be protected by the external cover 200 may be expanded. Also, the window 151a in which a manipulation command is inputted through user's touch may have a boundary by the external cover 200 to allow the outer appearance of the mobile terminal 100 to be elegant.

The appearance sheet 250 may include a plurality of appearance sheet bent parts 351 and 352 that are bent backward to correspond to the upper and lower bent parts 312 and 322.

The plurality of appearance sheet bent parts 351 and 352 may include an upper appearance sheet bent part 351 that is bent to face the upper bent part 312 and covered by the upper bent part 312 and a lower appearance sheet bent part 252 that is bent to face the lower bent part 322 and covered by the lower bent part 322.

In a state where an outer surface (i.e., a bottom surface) of the upper bent part 312 contacts the upper end of the window 151a, since an inner surface (i.e., a top surface) of the upper bent part 312 contacts one of the appearance sheet bent parts 351 and 352, the external cover 200 may prevent the upper bent part 312 from being lifted. Also, in a state where an outer (i.e., a bottom surface) of the lower bent part 322 contacts the lower end of the window 151a, since an inner surface (i.e., a bottom surface) of the lower bent part 322 contacts the other one of the appearance sheet bent parts 351 and 352, the external cover 200 may prevent the lower bent part 322 from being lifted.

FIGS. 16 to 19 are diagrams illustrating a coupling process of the external cover according to another embodiment.

Figure 16:
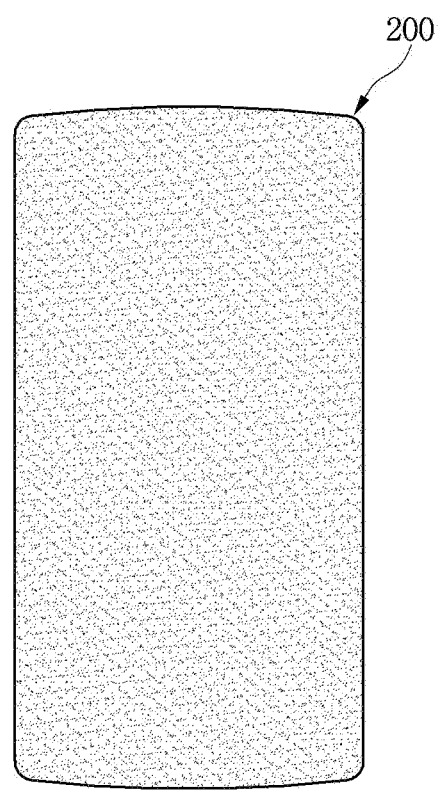
FIGS. 16 to 19 are diagrams illustrating a coupling process of an external cover according to another embodiment.
Figure 17:
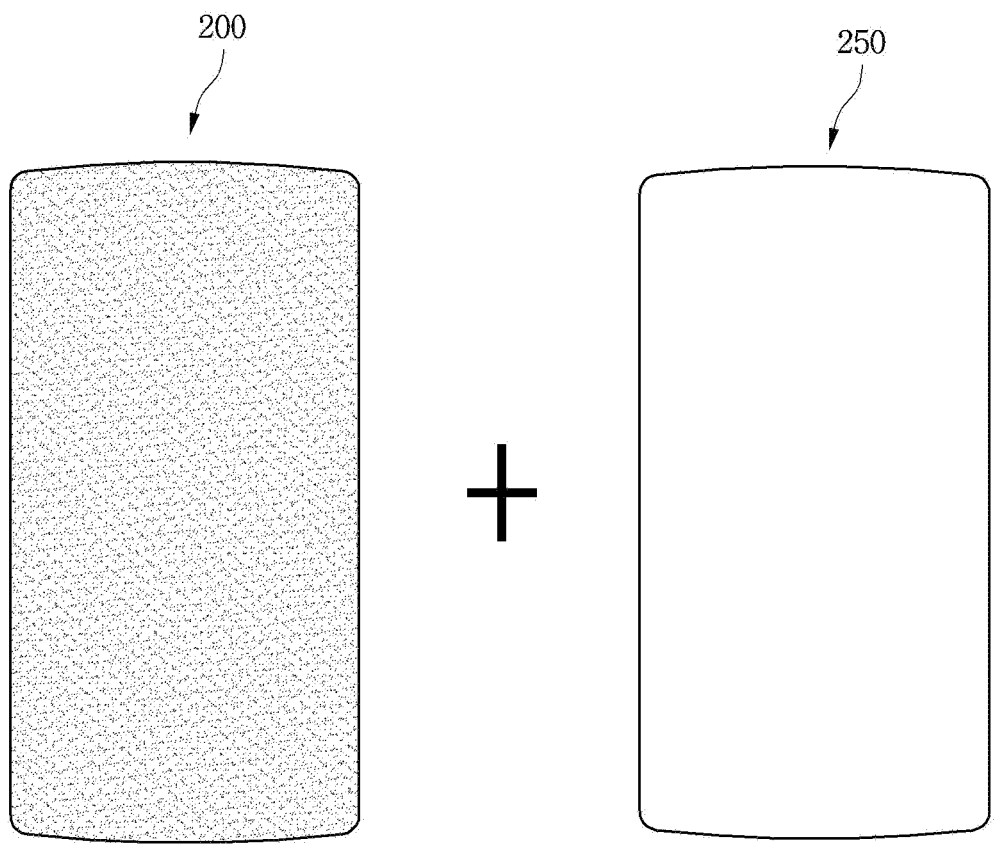

Referring to FIGS. 16 and 17, the external cover 200 and the appearance sheet 250 may be coupled to each other. Since it is difficult to form a specific shape by using only the external cover 200 formed of the soft material, the external cover 200 may be coupled to the appearance sheet 250 formed of the material having the relatively high rigidity to reinforce the rigidity of the external cover 200.

Here, the external cover 200 and the appearance sheet 250 may be coupled by using a laminating manner using a tape for providing adhesion force or an adhesion material and high pressure.

Figure 18:
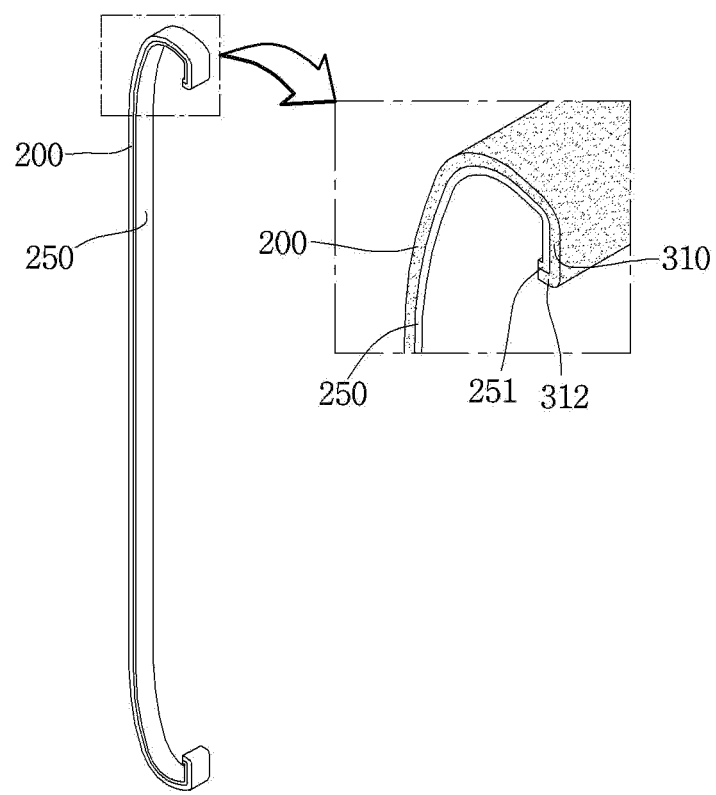

Next, as illustrated in FIG. 18, the appearance sheet 250 coupled to the external cover 200 may have a shape corresponding to that of the terminal body 100a. The shape may be formed by punching a hole to match the outer appearance of the mobile terminal 100 that is designed by applying press and forming methods and then forming the extension parts 310 and 320 and the bent parts 312 and 322.

Figure 19:
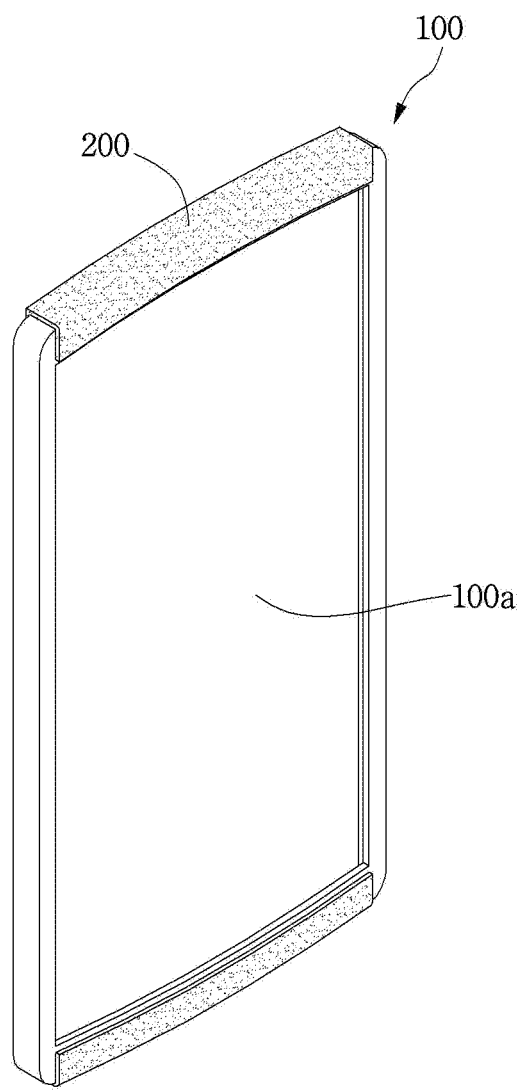

Also, as illustrated in FIG. 19, a specific material may be injected into the appearance sheet 250 by using a mold to form the terminal body 100a. That is to say, a material for the terminal body 100a may be injected into the mold having a shape of the designed terminal body and then molded. Then, the terminal body 100a to which the external cover 200 is coupled may be integrally injection-molded.

Thus, according to an embodiment, the terminal body 100a, the external cover 200, and the appearance sheet 250 may be integrally injection-molded to simplify the manufacturing process. Also, an error in dimension due to a separate manufacturing process may be prevented, and manufacturing costs of the mobile terminal 100 may be reduced.

Figure 20:
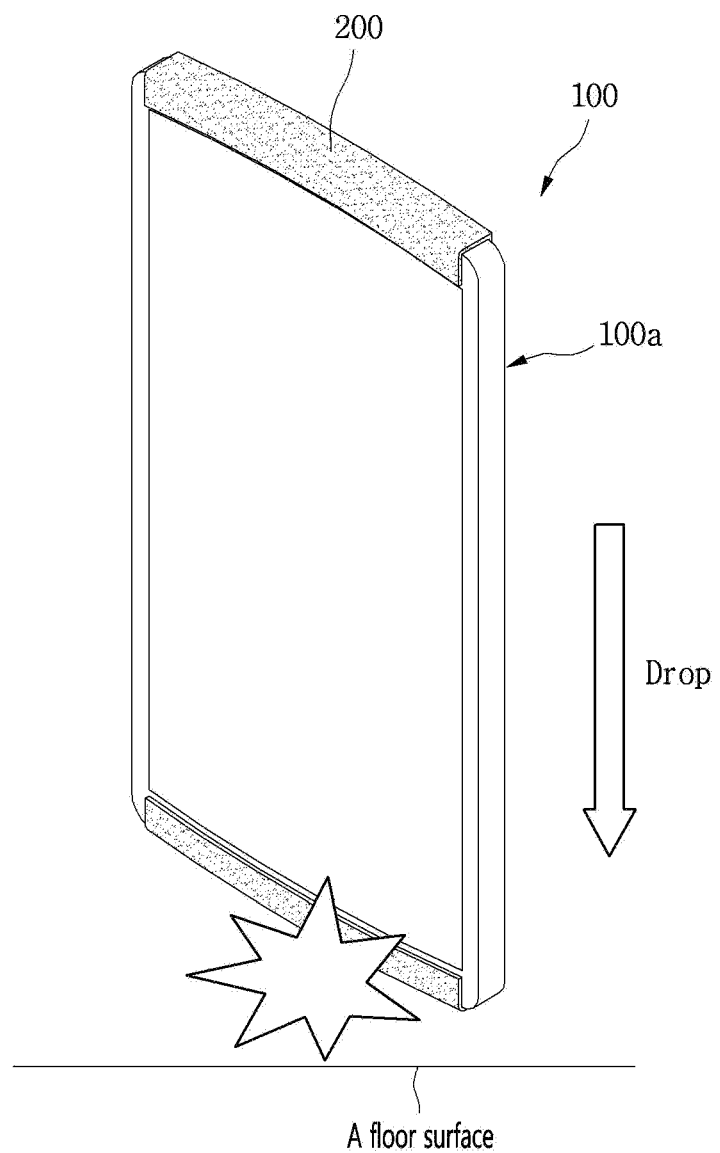
FIG. 20 is a perspective view of a state in which the mobile terminal drops according to another embodiment.
Figure 21:
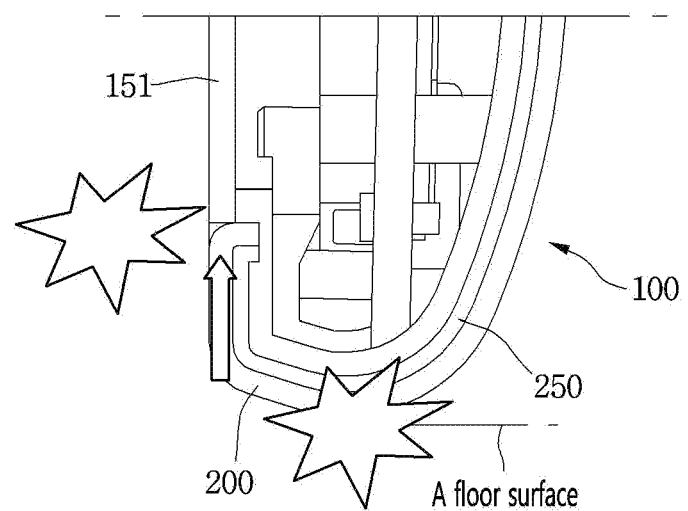
FIG. 21 is a cross-sectional view illustrating an internal state of the mobile terminal when the mobile terminal drops according to another embodiment.

FIG. 20 is a perspective view of a state in which the mobile terminal drops according to another embodiment, and FIG. 21 is a cross-sectional view illustrating an internal state of the mobile terminal when the mobile terminal drops according to another embodiment.

Referring to FIGS. 20 and 21, the mobile terminal 100 according to an embodiment may reduce the impact applied from the outside by the appearance sheet 250 and the external cover 200, which are coupled to the outer surface of the mobile terminal 100a.

As described above, since the external cover 200 is formed of the soft material such as the leather, when the impact is applied to the outer surface of the mobile terminal 100, the impact may be reduced by the self-elastic force of the external cover 200. Also, in case of the leather material, there is no fear of breaking or stabbing of the surface even through the mobile terminal drops. Thus, the surface of the mobile terminal 100 may be maintained in the clean state.

Also, the appearance sheet 250 formed of a metal material having the relatively high rigidity than that of the external cover 200 may be disposed inside the external cover 200 to realize a secondary impact reducing structure. That is, the external cover 200 may prevent the surface of the mobile terminal 100 from being damaged, and the appearance sheet 250 may prevent the impact from being transmitted into the mobile terminal 100.

The mobile terminal according to the embodiments may have the following effects.

First, since the external cover covers a portion of the front surface of the mobile terminal in addition to the outer surface of the mobile terminal, the area that is capable of protecting the mobile terminal against the external impact and the foreign substances may be expanded.

Second, since the coupling groove is defined in the top surface of the window, and the external cover is seated in the coupling groove, the large-scale window may be maintained. Also, the external cover may be firmly coupled to the front surface of the window by the coupling sheet disposed between the external cover and the coupling groove.

Third, the external cover is formed of a leather material, the outer appearance of the mobile terminal may be more refined.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a terminal body having a front surface;
a window disposed at the front surface of the terminal body, the window having a front surface and a rear surface;
a display disposed at the rear surface of the window to output an image; and
an external cover coupled to an outer surface of the terminal body to protect an outer appearance of the terminal body, the external cover including a front cover that covers at least one outer surface of a top surface of the terminal body, a bottom surface of the terminal body, a left of the terminal body, or a right surface of the terminal body and a portion of the front surface of the window,
wherein the front cover includes:
a first cover that covers the top surface of the terminal body and an upper front surface of the window; and
a second cover that covers the bottom surface of the terminal body and a lower front surface of the window,
wherein the first cover includes:
a main body covering the upper front surface of the window; and
a curved part curved backward from an end of the main body to cover the top surface of the terminal body,
wherein the second cover includes:

a main body covering the lower front surface of the window; and a curved part curved backward from an end of the main body to cover the bottom surface of the terminal body, and wherein the window includes:

an upper coupling groove that is recessed backward by a predetermined distance to form an upper stepped portion to which the main body of the first cover is coupled, the main body of the first cover being seated in the upper coupling groove; and a lower coupling groove that is recessed backward by a predetermined distance to form a lower stepped portion to which the main body of the second cover is coupled, the main body of the second cover being seated in the lower coupling groove.

2. The mobile terminal according to claim 1, further comprising:

an upper coupling sheet located between a seating surface of the upper coupling groove and a rear surface of the main body of the first cover; and a lower coupling sheet located between a seating surface of the lower coupling groove and a rear surface of the main body of the second cover.

3. The mobile terminal according to claim 2, wherein each of the upper coupling sheet and lower coupling sheet has a relatively higher rigidity than that of the main body of the corresponding first and second covers.

4. The mobile terminal according to claim 2, wherein at least one of the upper coupling sheet or lower coupling sheet has a through hole passing therethrough.

5. The mobile terminal according to claim 2, wherein the sum of a thickness of the upper coupling sheet and a thickness of the main body of the first cover corresponds to a recessed depth of the upper coupling groove.

6. The mobile terminal according to claim 1, further comprising an adhesion part for coupling an end of the main body of the first cover to the window is disposed on an area on which the upper stepped portion of the window is formed.

7. The mobile terminal according to claim 6, wherein the adhesion part comprises epoxy that is applied to the area on which the upper stepped portion of the window is formed.

8. The mobile terminal according to claim 1, wherein the external cover further comprises a rear cover coupled to a rear surface of the terminal body to cover the rear surface of the terminal body.

9. The mobile terminal according to claim 1, wherein the external cover is formed of a material that is selected from the group consisting of natural leather, synthetic leather, and fabric.

10. The mobile terminal according to claim 1, wherein a user manipulation unit for inputting a manipulation command of a user by touch is disposed on a lower front surface of the window that is covered by the external cover, and wherein the external cover inputs the manipulation command through the user manipulation unit when the user touches a top surface of the external cover.

11. A mobile terminal comprising:

a terminal body having a front surface and a rear surface;

a window disposed at the front surface of the terminal body, the window having a front surface and a rear surface;

a display disposed at the rear surface of the window to output an image;

a first cover covering at least a portion of a top surface of the terminal body and an upper front surface of the window;

a second cover covering at least a portion of a bottom surface of the terminal body and a lower front surface of the window; and a rear cover coupled to the rear surface of the terminal body to cover the rear surface of the terminal body, wherein a first coupling groove that is recessed backward by a predetermined distance to form a stepped portion with respect to another area of the window is defined in an area of a front surface of the window to which the first cover is coupled, wherein a second coupling groove that is recessed backward by a predetermined distance to form a stepped portion with respect to said another area is defined in an area of the front surface of the window to which the second cover is coupled, wherein at least a portion of the first cover is seated in the first coupling groove, and wherein at least a portion of the second cover is seated in the second coupling groove.

12. The mobile terminal according to claim 11, wherein a coupling sheet that provides adhesion force on both surfaces thereof is disposed between the first coupling groove and the first cover and between the second coupling groove and the second cover.

* * * * *